United States Patent [19]

Ooi et al.

[11] Patent Number: 4,498,195
[45] Date of Patent: Feb. 5, 1985

[54] RADIO INTERFERENCE DETECTION DEVICE FOR USE IN A MULTI-CHANNEL ACCESS ANGLE-MODULATION RADIO SYSTEM

[75] Inventors: Tetsuo Ooi, Tokyo; Hiroshi Watanabe, Sendai; Akio Gotoh, Tokyo; Shuitsu Tsutsumi, Tokyo; Ryohei Oba, Tokyo; Koichi Ito, Tokyo; Syouzi Huse, Tokyo, all of Japan

[73] Assignees: Nippon Telegraph & Telephone Public Corporation, Tokyo; Tokyo Shibaura Denki Kabushiki Kaisha, Kawasaki, both of Japan

[21] Appl. No.: 472,246

[22] Filed: Mar. 4, 1983

[30] Foreign Application Priority Data

Mar. 5, 1982 [JP] Japan ................................. 57-34650
Mar. 5, 1982 [JP] Japan ................................. 57-34651

[51] Int. Cl.³ .......................... H04B 1/16; H04B 1/10
[52] U.S. Cl. .................................... 455/205; 455/295; 455/303
[58] Field of Search ............... 455/205, 210, 212, 295, 455/303, 305; 381/13; 329/132, 135, 130

[56] References Cited

U.S. PATENT DOCUMENTS 3,696,301 10/1972 Hoshi ................................. 455/205
3,881,155 4/1975 Saikaishi ............................ 455/205
4,166,251 8/1979 Ishigaki et al. ..................... 455/205
4,211,978 7/1980 Takahashi ........................... 455/295

FOREIGN PATENT DOCUMENTS 54-12286 5/1979 Japan .
56-6660 2/1981 Japan .
48729 5/1981 Japan .................................. 455/205
56-51702 12/1981 Japan .

Primary Examiner—Jin F. Ng
Attorney, Agent, or Firm—Cushman, Darby & Cushman

[57] ABSTRACT

A radio interference detection device for use in a multi-channel access angle-modulation radio system. A detecting system detects a received signal prior to angle demodulation and produces an AM component of the received signal which is then rectified. A determining section then determines the level of the rectified signal for use in detecting interference in accordance with a determination result. The determining section includes an angle demodulator for angle-demodulating the received signal, a first comparator for comparing the angle-demodulated signal and the rectified signal, a second comparator for producing the detection signal when the rectified signal exceeds a predetermined level and a gate for passing the output signal from the second comparator only when the angle-demodulated signal is smaller than the rectified signal.

5 Claims, 15 Drawing Figures

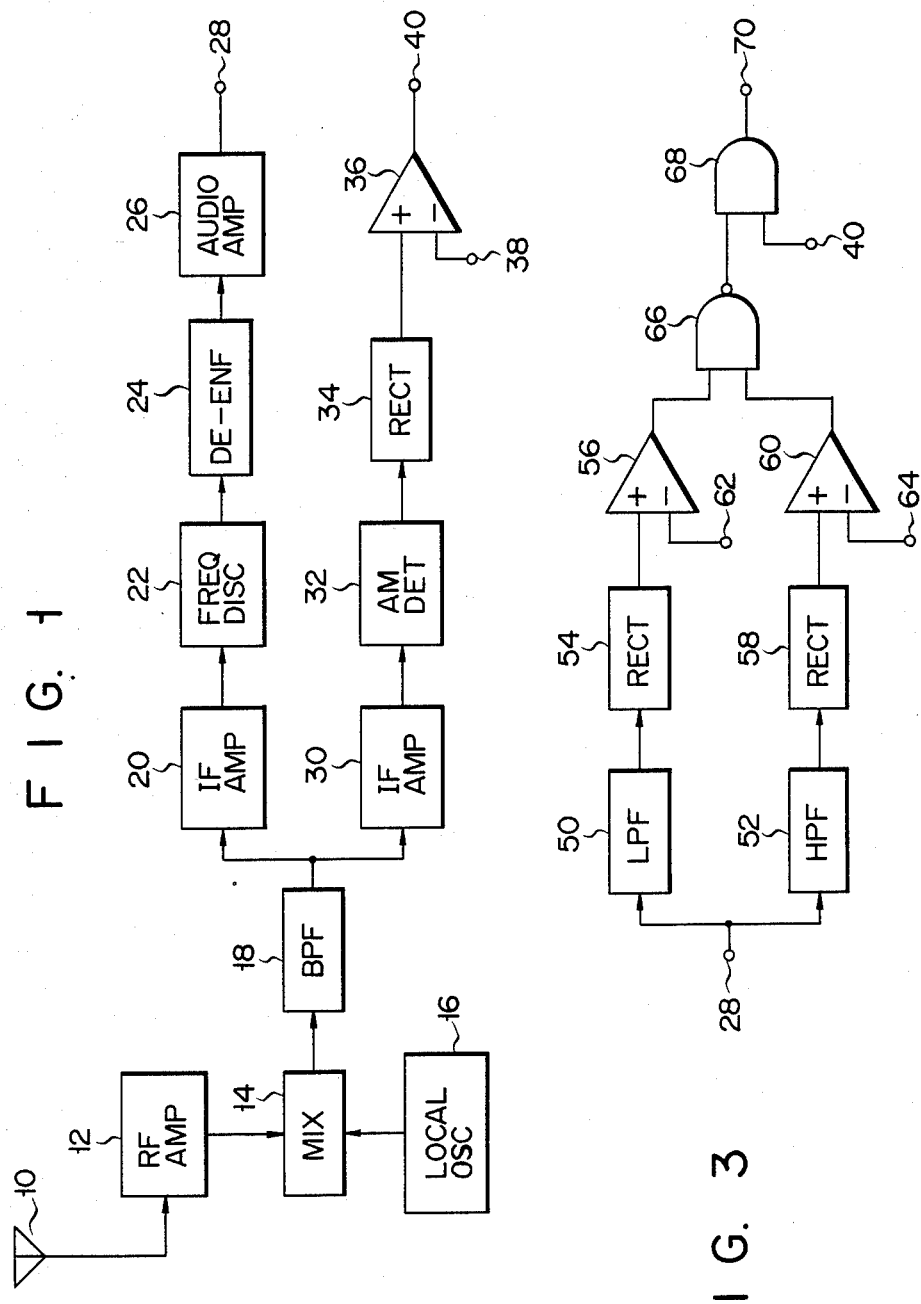

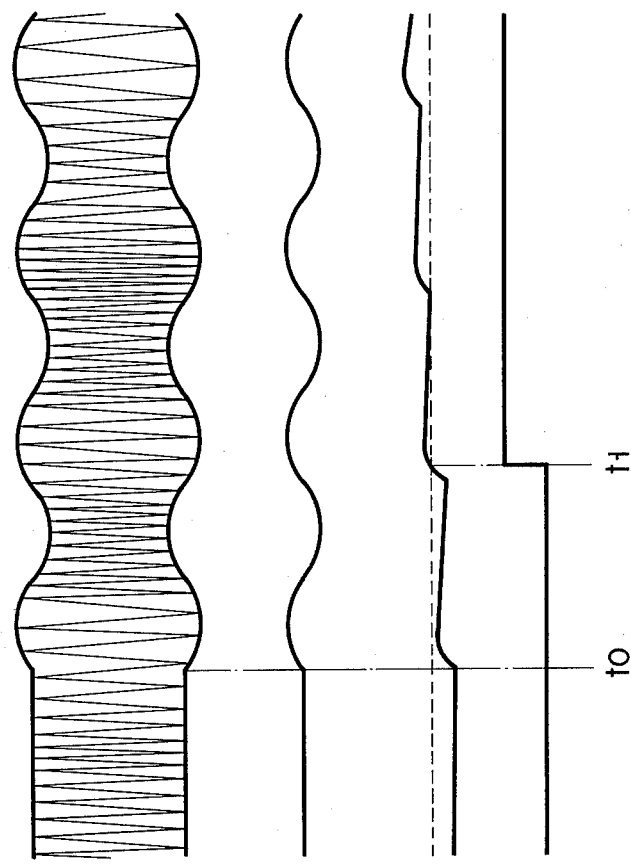

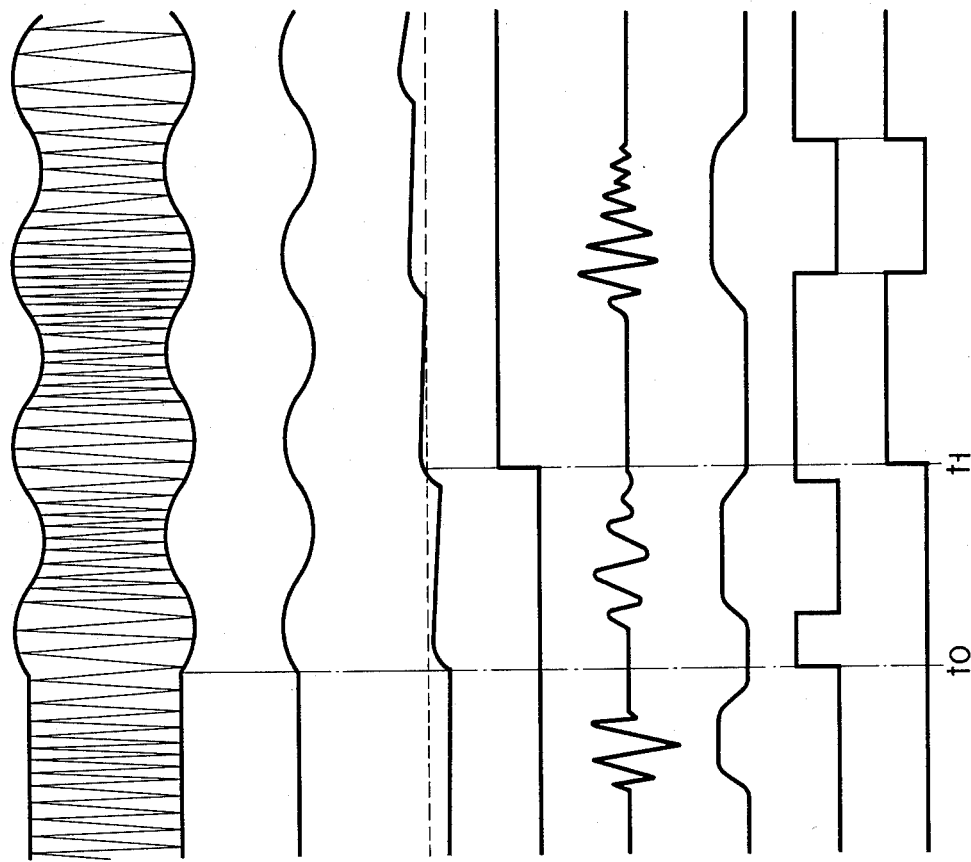

RADIO INTERFERENCE DETECTION DEVICE FOR USE IN A MULTI-CHANNEL ACCESS ANGLE-MODULATION RADIO SYSTEM

BACKGROUND OF THE INVENTION

The present invention relates to a radio interference detection device for detecting an interference in the same channel of radio equipment of a multi-channel access system.

In a conventional car telephone system, the multi-channel access system is adopted to effectively utilize the radio frequencies. In the multi-channel access system, a plurality of apparatuses together use a plurality of frequency channels. In the multi-channel access system of the type described above, the voice (or speech) channel of each telephone is controlled by a single common station or a single station which is connected to a plurality of local stations. According to the multi-channel access system, the control station can supervise all the mobile transmitter/receivers. If a new call is made, a channel which is not currently used can be easily assigned to this call. Therefore, in the busy mode, channel interference does not occur. Channel interference is here defined as a situation where a ratio (S/I) of the audio signal (S) to the interference output (I) is lowered by beat noise caused by an indefinite difference (e.g., about 1 kHz) between the two frequencies in the same channel, thereby degrading speech quality.

However, in a telephone system such as a cordless telephone system which has a host station (stationary station) disposed at the subscriber's terminal and a mobile station (cordless telephone set) connected to the host station through a radio relay system in one-to-one correspondence, the respective cordless telephone sets do not have a common station. Therefore, when a call is made, the corresponding cordless telephone determines a free channel to allow communication. If two or more cordless telephones using the same channel move into proximity to each other, a channel interference occurs, thereby interfering with the conversation. When the S/I ratio is degraded by beat noise, speech quality is degraded even if a ratio (D/U) of a desired wave (D) to an undesired wave (U) is high. It is very difficult to avoid the problem described above. Therefore, the multi-channel access system cannot really be applied to the cordless telephone system, although this access system allows effective use of radio frequencies.

A method is conventionally proposed in which beat noise is detected to prevent channel interference. Angle modulation is generally performed in the cordless telephone system. The ratio S/I (dB) is improved with respect to the ratio D/U (dB), as follows:

$$S/I = D/U + 20 \log m \quad (1)$$

where m is the standard modulation factor (rad).

In general, the channel separation frequency in the cordless telephone is 25 kHz, and the standard modulation factor is 3.5 rad. An S/I ratio is improved by 11 dB (20 log m). The S/I ratio of the base-band signal is considerably greater than the ratio D/U of the radio channel signal.

S/N ratio of a noise mixed in the audio transmission channel, such as an ambient noise of the cordless telephone, i.e., S/Nr ratio does not change even after it is transmitted through a radio channel and is demodulated. In general, a standard voice of 94 dB and ambient noise of 60 dB enter the receiver of the telephone set, so that the S/Nr ratio is 34 dB. The S/N ratio of the ambient noise appeared in the demodulated base-band signal is 34 dB. In fact, radio channel noise is mixed in the base-band signal. However, in telephone equipment such as a cordless telephone set connected to the subscriber's terminal, the S/N ratio of the radio channel noise is greater than 34 dB. Therefore, it can be neglected.

Beat noise is generally detected in a manner such that zero-crossings of the base-band output are detected, digitized detection signals are counted to a predetermined value. If a certain continues for a predetermined duration, it indicates beat noise. However, this conventional detection method can be effective only when the D/U ratio is low due to the presence of ambient noise. In order to detect beat noise having the same level as that of the ambient noise, the I/Nr ratio must be about 10, i.e., 20 dB. If the I/Nr ratio is less than 20 dB, beat noise has a lower level than ambient noise. In this case, the D/U ratio is less than 3 dB in accordance with equation (1). Therefore, this conventional method is not practical since it is effective in detecting beat noise only when the D/U ratio is not more than 3 dB.

SUMMARY OF THE INVENTION

It is an object of the present invention to provide a radio interference detection device which is capable of detecting a radio interference without being influenced by ambient noise even when a D/U ratio is high.

It is another object of the present invention to provide a radio interference detection device which in capable of detecting interference beat noise independently of beat noise by a normal speech signal.

In order to achieve the above objects of the present invention, there is provided a radio interference detection device to be employed for a multi-channel access angle-modulation radio system formed of a plurality of apparatuses which commonly use a plurality of frequency channels and each of which has a pair of a stationary station and a mobile station, comprising a detector for detecting an amplitude-modulated component of an angle-modulated signal received during service before the angle-modulated signal is demodulated, and a determining circuit for detecting an interference in accordance with an output from the detector.

BRIEF DESCRIPTION OF THE DRAWINGS

FIG. 1 is a block diagram of a radio interference detection device according to a first embodiment of the present invention;

FIGS. 2A to 2D are timing charts for explaining the mode of operation of the device shown in FIG. 1;

FIG. 3 is a block diagram of a radio interference detection device according to a second embodiment of the present invention;

FIGS. 5A to 5H are timing charts for explaining the mode of operation of the device shown in FIG. 4.

DETAILED DESCRIPTION OF THE PREFERRED EMBODIMENTS

Figure 4:
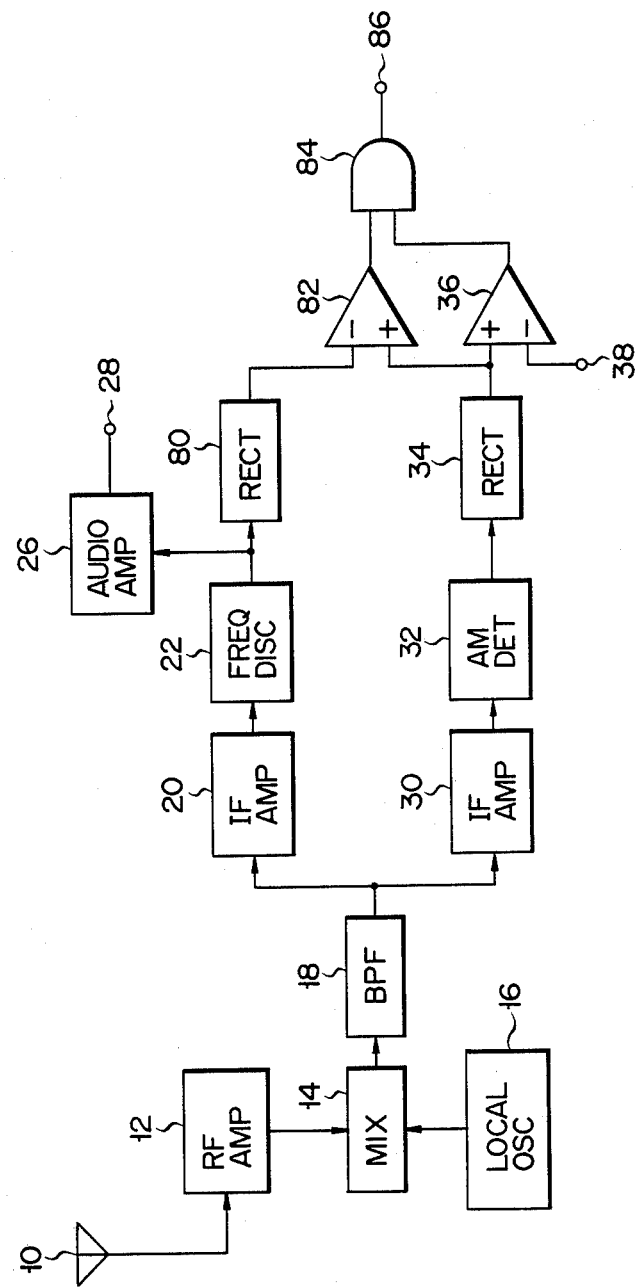
FIG. 4 is a block diagram of a radio interference detection device according to a third embodiment of the present invention.

Embodiments of the present invention will be described with reference to the accompanying drawings. FIG. 1 is a block diagram of a radio interference detection device according to a first embodiment of the present invention. This detection device can be arranged in a pair of a stationary station and a mobile station, or in one of the stations. An output (phase-modulated wave) from a reception antenna 10 is amplified by a radio-frequency amplifier 12. The amplified signal is mixed by a mixer 14 with an output from a local oscillator 16. An output from the mixer 14 is supplied to a band-pass filter 18 which only filters through an intermediate frequency signal. The intermediate frequency signal is amplified to a detection level by an intermediate frequency amplifier 20. The amplified IF signal is FM-detected by a frequency discriminator 22. An output from the frequency discriminator 22 is phase-demodulated by a de-emphasis circuit 24 of 6 dB/oct. The phase-demodulated output is amplified by an audio amplifier 26 to an audible level. This demodulated signal appears as a base-band output at an audio output terminal 28. The components from the reception antenna 10 to the audio output terminal 28 constitute a so-called PM receiver. The audio output terminal 28 is connected to a telephone receiver.

Meanwhile, the intermediate frequency signal from the band-pass filter 18 is also supplied to an amplitude modulation detector 32 through an IF amplifier 30 with AGC to obtain an amplitude-modulated component of the intermediate frequency signal. The envelope of the AM component is detected by a rectifier 34 which then produces a DC signal. The DC signal is then supplied to the noninverting input end of a comparator 36. A reference voltage terminal 38 is connected to the inverting input end of the comparator 36. An output end of the comparator 36 is connected to a detection output terminal 40 which is connected to a radio channel switching control circuit.

FIGS. 2A to 2D are timing charts for explaining the mode of operation of the device shown in FIG. 1. FIG. 2A shows an output from the reception antenna 10, an output from the band-pass filter 18, and an output from the IF amplifier 30. These three signals have the same waveform but different amplitudes. For illustrative convenience, assume that two mobile stations using the same channel are entering in the same zone at time $t_0$. It is noted that the access frequencies of the two mobile stations are not strictly equal, but have a difference of about 1 kHz, thereby causing channel interference. When this occurs, the output signal shown in FIG. 2A is amplitude-modulated in accordance with the D/U ratio. Thus, an AM signal is obtained. The amplitude modulation factor $m_{AM}$ of the modulated signal is given as follows:

$$m_{AM} = U/D \qquad (2)$$

The frequency of the AM signal corresponds to a difference between the desired wave frequency and the undesired wave frequency. The AM signal is detected by the AM detector 32, so that only the AM component shown in FIG. 2B is produced by the AM detector 32. The AM component is then envelope-detected by the rectifier 34.

The output signal from the rectifier 34 rises at time t0, as shown in FIG. 2C. The level shown by a broken line in FIG. 2C is a reference level voltage $V_{th}$ applied to the inverting input end of the comparator 36. When the output signal from the rectifier 34 exceeds the reference level voltage $V_{th}$ at time $t_1$, the output signal from the comparator 36 goes high (logic level "1") as shown in FIG. 2D, thereby detecting channel interference at time $t_1$. According to the first embodiment, since the channel interference is detected using the AM component of the intermediate frequency signal, an improved S/I ratio (20 log m) by angle demodulation in accordance with equation (1) may not be included in the detection output. Therefore, the channel interference can be detected even if the D/U ratio is high.

In the AM detection system, an input wave received by the reception antenna 10 theoretically has a constant amplitude if the input wave is an FM or PM angle-modulated wave. For this reason, an audio signal from the telephone or ambient noise may not be detected inadvertently. Therefore, it is effective to use the AM detection system in order to detect the channel interference. However, strictly speaking, when the frequency characteristic of the band-pass filter 18 includes a ripple, an AM component is generated from the PM wave. The reference level voltage $V_{th}$ of the comparator 36 is determined to be a value at which the AM component caused by the ripple may not be detected. In general, a radio receiver/transmitter has a modulation frequency of 1 kHz as a typical value of a voice band. A description of this case will be made. If the standard modulation factor is 3.5 rad, the frequency deviation is 3.5 kHz. Also assume that the ramp of the ripple of the band-pass filter 18 is as bad as 3 dB/2 kHz and that the modulation frequency of the ambient noise is 1 kHz. This value is lower than that of the standard audio signal by 34 dB. The frequency deviation of the ambient noise is then 0.078 kHz. For this reason, the ratio of a peak value of the AM component from the band-pass filter 18 to a bottom value thereof is given as follows:

$$2 \times (0.078/2) \times 3 = 0.23(\text{dB})$$

$$= 1.03$$

This ratio corresponds to an AM modulation factor as follows:

$$m_{AM} = (1.03-1)/(1.03+1) = 1.5 \times 10^{-2}$$

The output from the band-pass filter 18 is a 1.5% AM modulated wave, so U/D = −36 dB is given in accordance with equation (2). In other words, it is possible to detect the channel interference when the D/U ratio is not more than 36 dB. It is natural that the D/U ratio is greater when the ripple component of the band-pass filter 18 decreases. However, the D/U ratio of 36 dB is very practical.

As described above, according to the first embodiment, the IF signal is AM-detected so as to detect the AM component by channel interference. Therefore, the interference component can not be improved by 20 log m and may not be covered up by the ambient noise component. As a result, even if the D/U ratio is high, channel interference can be sufficiently detected. Furthermore, since the channel interference is detected by comparing the DC signal corresponding to the detected AM component and the reference voltage level, no erroneous detection may result, even if the ripple component is present in the band-pass filter.

A case will be described in which a radio wave modulated by an audio signal is supplied. An AM component may be produced from the audio signal due to the ripple of the band-pass filter. Therefore, a detection device for preventing this erroneous detection will be described according to a second embodiment of the present invention.

FIG. 3 is a block diagram showing the main part of a detection device for detecting an AM component caused by channel interference independently of the AM component caused by the speech signal. The detection device of the second embodiment is arranged such that a detection output is not produced when the audio signal appears at the audio signal output terminal 28 in the device of the first embodiment. The detection device is connected to the output terminals of the first embodiment. The audio signal output terminal 28 is connected to a low-pass filter 50 for filtering a signal of 1 kHz or lower and a high-pass filter 52 for filtering a signal of 1 kHz or higher. An output from the low-pass filter 50 is supplied to the noninverting input end of a comparator 56 through a rectifier 54. An output from the high-pass filter 52 is supplied to the noninverting input end of a comparator 60 through a rectifier 58. Reference voltage terminals 62 and 64 which are respectively connected to the inverting input ends of the comparators 56 and 60 have the same voltage level. Outputs from the comparators 56 and 60 are supplied to a NAND gate 66. The output end of the NAND gate 66 and the detection output terminal 40 shown in FIG. 1 are connected to input ends of an AND gate 68. The output end of the AND gate 68 is connected to a detection signal output terminal 70 in the second embodiment.

In this embodiment, a signal having a level corresponding to the presence or absence of an AM component of the IF signal is also supplied to the detection output terminal 40 connected to one input end of the AND gate 68 in the same manner as in the first embodiment. If the AM component is produced from the audio signal, the audio signal appears at the audio signal output terminal 28. The spectrum of the audio signal covers the low- and high-frequency bands. Therefore, the output signals from the comparators 56 and 60 go high. The output from the NAND gate 66 goes low. The AND gate 68 is disabled so as not to allow the detection output to pass therethrough. However, when only the beat noise component is appeared in the base-band signal, the beat noise component has a single frequency component corresponding to a difference between two frequencies. One of the outputs from the comparators 56 and 60 goes high. The AND gate 68 is enabled to pass the detection signal therethrough.

According to the second embodiment, when the audio signal is present, the detection signal output terminal goes low. However, when the audio signal is absent, the detection signal output terminal goes high or low according to the presence or absence of the beat noise component. Therefore, the beat noise component caused by channel interference can be distinguished from the AM component caused by audio signal.

The above distinction is made utilizing the spectrum of the audio signal according to the second embodiment. However, for this purpose, any other characteristic of the audio signal may be utilized. For example, the audio signal is discontinuous since the speaker speaks words while breathing therebetween. However, the beat noise is continuous. If a counter is connected to the detection output terminal 40, and detection signals continuously appear for a predetermined time interval (i.e., 5 seconds), these detection signals can be detected as a beat noise component, thereby detecting channel interference. If no beat noise component appears at the output terminal, the detection output is kept low as shown in FIG. 2D. In this condition, the counter can be reset. Furthermore, when a call is made using a cordless telephone which is in motion, the detection signal may be interrupted by fading. However, this can be solved by detecting the output signal duration per unit time.

FIG. 4 is a block diagram of a radio interference detection device according to a third embodiment of the present invention, wherein a beat noise component caused by channel interference is distinguished from the audio signal. This detection device has an arrangement for AM-detecting the IF signal to detect the beat noise component (i.e., the arrangement from the reception antenna 10 to the comparator 36) in the same manner as in the first embodiment. Furthermore, the IF signal is FM-detected and the base-band signal appears at the output terminal 28, in the same manner as in the first embodiment. However, the detection device of the third embodiment is applied to an FM receiver in place of the PM receiver. Referring to FIG. 4, an output from a frequency discriminator 22 is supplied to an audio amplifier 26 and to the inverting input end of a comparator 82 through a rectifier 80. The output end of the rectifier 34 is connected to the noninverting input end of the comparator 36 and is also connected to the noninverting input end of the comparator 82. The output ends of the comparators 82 and 36 are connected to an AND gate 84. The output end of the AND gate 84 corresponds to a detection signal output terminal 86. In fine, the output signal from the comparator 36 as obtained in the first embodiment is supplied to the AND gate 84 which is controlled by the output from the comparator 82 in the detection device of the third embodiment. The frequency discriminator 22 and the rectifier 80 detect a frequency-demodulated signal. The AM detector 32 and the rectifier 34 detect an amplitude-demodulated signal. These demodulated signals are supplied to the comparator 82. If the frequency-demodulated signal is smaller than the amplitude-demodulated signal, the AND gate 84 is enabled in response to the output from the comparator 36.

The mode of operation of the detection apparatus according to the third embodiment of the present invention will be described with reference to the timing charts in FIGS. 5A to 5H. FIGS. 5A to 5D respectively correspond to FIGS. 2A to 2D. FIG. 5A shows an output signal from the IF amplifier 30; FIG. 5B shows an output signal from the AM detector 32; FIG. 5C shows an output signal from the rectifier 34; and FIG. 5D shows an output signal from the comparator 36. An output signal from the frequency discriminator 22 is an FM component, as shown in FIG. 5E. An output signal from the rectifier 80 is shown in FIG. 5F. If the IF signal includes a beat noise component corresponding to the D/U ratio, the output signal from the rectifier 80 has a level corresponding to the D/U ratio. When the desired wave neither includes the audio signal nor is angle-modulated, the output signal from the frequency discriminator 22 has a level which is $1/(D/U+m)$ with respect to the level of the standard modulation factor $(m \geq 1)$. The output signal from the rectifier 80 is then decreased to be smaller than the AM signal. The output from the comparator 82 then goes high, and the output signal from the comparator 36 passes through the AND gate 84.

A case will be considered in which the audio signal is included in the desired wave and is angle-modulated. The output signal from the rectifier 80 becomes greater than that from the rectifier 34. The output signal from the comparator 82 then goes low. Therefore, the AND gate 84 only produces a signal of low level. More specifically, even if an output of hgh level is produced by the comparator 36, this output may not be regarded as being a detection signal during an audio signal period. The output signals from the comparator 82 and the AND gate 84 are shown in FIGS. 5G and 5H, respectively.

According to the third embodiment of the present invention, when an angle-modulated signal component of the audio signal is present, the AND gate 84 is disabled. In this condition, the output from the comparator 36 may not be regarded as being the detection output. Therefore, the beat noise component caused by channel interference can be efficiently distinguished from the beat noise component caused by the audio signal.

The circuit conditions for the above-mentioned operation will be described below. If a signal $e_D = D \cos(\omega_C t + (\Delta\Omega/\omega) \cos \omega t)$ is received by the reception antenna 10, an output signal $e_{FM}$ from the frequency discriminator 22 is given as follows:

$$e_{FM} = K_{FM} \cdot \Delta\Omega \sin \omega t \quad (3)$$

where
- $\omega_C$: angular frequency of the carrier
- $\Delta\Omega$: maximum angular frequency deviation
- $\omega$: modulating frequency
- $K_{FM}$: FM detection sensitivity An output $e_{FS}$ from the rectifier 80 which rectifies the output $e_{FM}$ is given as follows:

$$e_{FS} = R_{FM} \cdot K_{FM} \cdot \Delta\Omega \quad (4)$$

where
$R_{FM}$: rectifying efficiency of the rectifier 80.

If the band-pass filter 18 has a first order ramp $\alpha$ (sec/rad) as the filtration level characteristic, the band-pass filter 18 produces the AM-modulated signal $e_{D\cdot AM}$ as follows:

$$e_{D\cdot AM} = D(1 + \alpha \cdot \Delta\Omega \cos \omega t) \times \cos(\omega_C t + (\Delta\Omega/\omega) \cos \omega t) \quad (5)$$

An output $e_{AM}$ from the AM detector 32 is, therefore, given as follows:

$$e_{AM} = K_{AM} \cdot \alpha \cdot \Delta\Omega \cos \omega t \quad (6)$$

where
$K_{AM}$: AM detection sensitivity

An output $e_{AS}$ from the rectifier 34 is, therefore, given as follows:

$$e_{AS} = R_{AM} \cdot K_{AM} \cdot \alpha \cdot \Delta\Omega \quad (7)$$

where
$R_{AM}$: rectifying efficiency of the rectifier 34.

On the other hand, assume that a nonmodulated desired wave $e_D$ and a channel interference wave $e_U$ are received by the reception antenna 10. A composite wave $e$ is given as follows:

$$e \approx D\{1 + (U/D) \cos(\Delta\omega t + \phi)\} \times \cos(\omega_C t + (U/D) \cos \Delta\omega t) \quad (8)$$

where
$\Delta\omega$: beat frequency.

The composite signal is FM- and AM-demodulated to obtain signals $e_{FS}'$ and $e_{AS}'$ as follows:

$$e_{FS}' = R_{FM} \cdot K_{FM} \cdot (U/D) \cdot \Delta\omega \quad (9)$$

$$e_{AS}' = R_{AM} \cdot K_{AM} \cdot (U/D) \quad (10)$$

As may be apparent from the above relations, the comparator 82 provides a condition for distinguishing the beat noise component of the audio signal from the beat noise component of the channel interference as follows:

Detection of Beat Caused by Audio Signal $$e_{FS}/e_{AS} = (R_{FM} \cdot K_{FM} \cdot \Delta\Omega)/(R_{AM} \cdot K_{AM} \cdot \alpha \cdot \Delta\Omega) \quad (11)$$

$$= (R_{FM} \cdot K_{FM})/(R_{AM} \cdot K_{AM} \cdot \alpha) > 1$$

Detection of Beat Caused by Channel Interference $$e'_{FS}/e'_{AS} = (R_{FM} \cdot K_{FM} \cdot (U/D) \cdot \Delta\omega)/(R_{AM} \cdot K_{AM} \cdot (U/D)) \quad (12)$$

$$= (R_{FM} \cdot K_{FM} \cdot \Delta\omega)/(R_{AM} \cdot K_{AM}) < 1$$

According to equations (11) and (12), the condition of the detection sensitivity, the rectifying efficiency and so on is given as follows:

$$1/\Delta\Omega > (R_{FM} \cdot K_{FM})/(R_{AM} \cdot K_{AM}) > 1/\alpha \quad (13)$$

where $\Delta\omega$ is a frequency difference to be detected. This frequency difference is inherent to each transmitter/receiver. For example, in a transmitter/receiver having a frequency variation of 5 ppm at 400 MHz, the frequency difference to be detected is not more than 4 kHz. Therefore, as the condition for performing sufficient detection, $\alpha$ must satisfy inequality (13).

The third embodiment is exemplified by an FM receiver. However, a filter (de-emphasis circuit) of 6 dB/oct may be connected to the output end of the frequency discriminator 22. In this case, a PM receiver is obtained. An output $e_{FS}'$ (equ. (9)) from the rectifier 80 is given as follows:

$$e_{FS}' = R_{FM} \cdot K_{FM} \cdot (U/D) \quad (14)$$

The frequency characteristics have been eliminated from the equation (14). Therefore, the condition for the PM receiver is as follows:

$$(R_{FM} \cdot K_{FM})/(R_{AM} \cdot K_{AM}) > 1/\alpha \quad (15)$$

It is noted that $R_{FM}$, $K_{FM}$, $R_{AM}$ and $K_{AM}$ can be readily controlled by controlling gains of the circuits 22, 80, 32 and 34, respectively. The gains of these circuits may be controlled by connecting an amplifier.

According to the third embodiment, when the desired wave D becomes weak even if channel interference does not occur, noise is mixed in the detection outputs. The output from the comparator 82 is unstabilized, and this may result in erroneous operation. In order to prevent such erroneous operation, the reference level of the comparator 36 may be raised, or a squelch circuit may be arranged.

According to the present invention as described above, the IF signal prior to angle demodulation is AM-detected to detect the beat noise component. Therefore, channel interference can be properly detected even if the D/U ratio is high. Furthermore, since the presence or absence of the audio signal component is detected by the angle-demodulated signal, the beat noise component caused by the audio signal may be properly distinguished from that caused by channel interference, thus preventing erroneous operation.

The present invention is not limited to the above particular embodiments. Various changes and modifications may be made within the spirit and scope of the present invention. In the embodiments described above, a beat detection signal is obtained from the output of the band-pass filter. However, for this purpose, any other signal prior to demodulation may be used. The IF amplifier connected to the input of the AM detector has an automatic gain control function. However, AGC may also be provided before the IF amplifier.

What we claim is:

1. A radio interference detection device for use in a multi-channel access angle-modulation radio system including at least one stationary station and at least one mobile station, said device comprising:
   detecting means for AM-detecting a reception signal prior to angle demodulation and for producing an AM component of the reception signal;
   rectifying means for rectifying an output signal from said detecting means; and
   determining means for determining a level of an output signal from said rectifying means and for detecting interference in accordance with a determination result, said determining means comprising:
   angle demodulating means for angle-demodulating the reception signal;
   first converting means for converting a first band component of the output from said angle demodulating means to a first DC signal;
   second converting means for converting a second band component other than the first component of the output from said angle demodulating means to a second DC signal;
   a comparator for producing a detection signal when the level of the output signal from said rectifying means exceeds a first predetermined level; and
   a gate connected to an output end of said comparator, said gate being enabled to pass an output signal from said comparator when one of the levels of the first and second DC signals from said first and second converting means exceeds a second predetermined level.

2. A device according to claim 1, in which said first and second converting means respectively include a low-pass filter and a high-pass filter which have the same cutoff frequency.

3. A device according to claim 1, in which said gate comprises an AND gate, the first and second DC signals from said first and second converting means being supplied to noninverting input ends of first and second comparators, respectively, a signal having the second predetermined level, being supplied to inverting input ends of the first and second comparator, and said first and second comparators supplying output signals to said AND gate through a NAND gate.

4. A radio interference detection device for use in a multi-channel access angle-modulation radio system including at least one stationary station and at least one mobile station, said device comprising:
   detecting means for AM-detecting a reception signal prior to angle demodulation and for producing an AM component of the reception signal;
   rectifying means for rectifying an output signal from said detecting means; and
   determining means for determining a level of an output signal from said rectifying means and for detecting interference in accordance with a determination result, said determining means comprising:
   angle demodulating means for angle-demodulating the reception signal;
   a first comparator for comparing a DC level of an output signal from said angle demodulating means and a level of the output signal from said rectifying means;
   a second comparator for producing a detection signal when the level of the output signal from said rectifying means exceeds a predetermined level; and
   a gate for passing said detecting signal from said second comparator only when said first comparator produces a signal indicating that a demodulated output from said angle demodulating means is smaller than the output signal from said rectifying means.

5. A device according to claim 4, in which said gate comprises an AND gate which receives the output signals from said first and second comparators, said first comparator having noninverting and inverting input ends to which the output signal from said rectifying means and the DC component of the angle-demodulated signal are respectively supplied, and said second comparator having noninverting and inverting input ends to which the output signal from said rectifying means and the signal having a predetermined level are respectively supplied.

* * * * *